July 8, 1958
E. R. PRICE
2,842,101
FLUID PRESSURE SERVO-MOTOR
Filed April 18, 1956
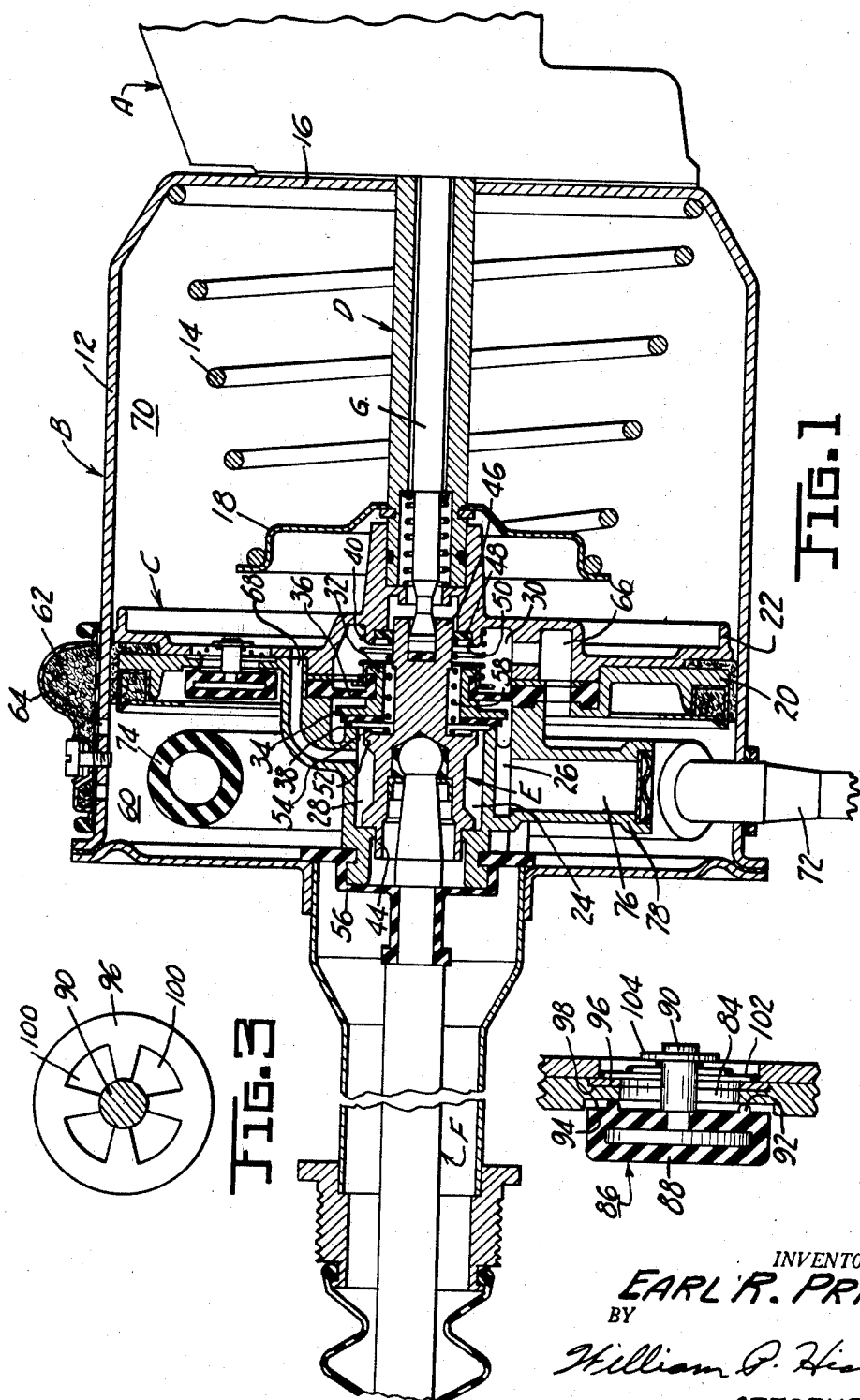
INVENTOR.
EARL R. PRICE
BY
William P. Hickey
ATTORNEY United States Patent Office 2,842,101
Patented July 8, 1958

2,842,101

FLUID PRESSURE SERVO-MOTOR

Earl R. Price, South Bend, Ind., assignor to Bendix Aviation Corporation, South Bend, Ind., a corporation of Delaware Application April 18, 1956, Serial No. 578,992

1 Claim. (Cl. 121—41)

The present invention relates to fluid pressure servo-motors of the type having power pistons and the like which are dragged along with the servo-motor's driven device, when the driven device is moved manually; and more particularly to automotive braking systems powered by such servo-motors, and wherein the brakes can be applied manually upon power failure.

An object of the present invention is the provision of a new and improved fluid pressure servo-motor having opposed chambers separated by a movable wall and which movable wall may be moved manually without appreciable resistance due to dash-pot effect between the opposed chambers.

A further object of the invention is the provision of a new and improved servo-motor of the above described type and comprising: means providing flow communication between its opposed chambers which means is devoid of elements that throttle flow therethrough, but which does include check valve means which permits a substantially unrestricted flow of air from the opposed chamber which is contracted into the opposed chamber which is expanded during manual movement of its movable wall.

A still further object of the invention is the provision of a new and improved servo-motor of the above described type in which the flow communicating means is provided by an opening extending through the servo-motor movable wall.

Another object of the invention is the provision of a new and improved automotive braking system which is normally power actuated but whose brakes are also capable of being applied manually, and which automotive braking system is power actuated by a servo-motor of the above described type to provide a braking system having new and improved ease of operation during manual application of its brakes.

Further objects and advantages will become apparent to those skilled in the art to which the invention relates from the following description of the preferred embodiment described with reference to the accompanying drawings forming a part of this specification, and in which:

Figure 1 is a fragmentary cross-sectional view of a power operated master cylinder for an automotive braking system, and in which principles of the present invention are embodied;

Figure 2 is an enlarged fragmentary cross-sectional view of a portion of the mechanism shown in Figure 1; and Figure 3 is an enlarged end view of one of the parts shown sectionally in Figures 1 and 2.

Referring now to Figure 1 of the drawing there is shown therein a servo-motor driven hydraulic master cylinder unit for automotive braking systems and the like. The unit generally comprises a hydraulic master cylinder A (only a portion of which is shown) attached to one end of a fluid pressure servo-motor B having an internal piston C connected to one end of a force transmitting member or piston rod D which extends into the master cylinder A for displacing hydraulic fluid therefrom. Movement of the power piston C is controlled by valve structure E mounted on the forward face of the piston C, and which valve structure is in turn actuated by a push rod F interconnecting the operative elements of the control valve E and the brake applying foot pedal lever (not shown) of an automotive vehicle. The master cylinder A is of the general type shown in Patent 2,685,172 granted to E. R. Price and will not further be described.

The vacuum power fluid servo-motor B is an atmospherically submerged unit in which atmospheric pressure normally exists on both sides of its power piston; and in which actuation of the piston C is accomplished by admitting vacuum to the back side of the piston. The outer edge of the piston C is provided with a pneumatic seal slidably engaging the side walls 12 of the servo-motor, and the piston C is biased to its normal brake releasing forward position shown in the drawing by means of a coil spring 14 positioned between the rear end wall 16 of the servo-motor and a spring abutment plate 18 suitably affixed to the fluid displacement member D.

Power piston C is formed in front and rear section 20 and 22, respectively, to provide an internal piston chamber 24 adapted to house the operative elements of the valve structure E. The internal piston chamber 24 is divided into vacuum, control and atmospheric valve chambers 26, 28 and 30, respectively, by means of a movable valve chamber partition member 32. The valve chamber partition member 32 is an annular member having front and rear radially outwardly extending flanges 34 and 36, respectively—the latter of which comprises a flexible diaphragm whose outer edges are clamped between the front and rear sections of the power piston. The front face of the front flange 34 is provided with a coating of resilient material for sealing engagement with the annular valve seat 38 cast into the side walls of the internal piston chamber 24; and the partition member 32 is biased forwardly into engagement therewith by a coil spring 40 positioned between the rear surfaces of the internal piston chamber 24 and an annular ring 42 of Z-shaped cross section fitted over the rear most end of the partition member.

The valve structure E further comprises a movable poppet member 44 positioned within the piston chamber 24 and having a portion 46 thereof extending rearwardly through an annular valve chamber partition member 32. The front end of the movable partition member 44 is slidably received and guided by a radially inwardly extending projection in the side walls of the chamber; and the rear most end of the movable poppet member 44 is received and guided by a plastic impregnated fabric washer 48 positioned in a counterbore 50 in the rear section 22 of the power piston. The poppet member 44 is provided with a flanged portion 52 having an annular valve seat 54 thereon for engagement with the front flange 34 of the movable member 32, to control the passage of air between the atmospheric chamber 30 and the control chamber 38. The front end of the control chamber 28 is closed off by means of a flexible diaphragm 56 suitably interpositioned between the push rod F and the portion of the front piston section 20 forming the side walls of the piston chamber 24. The movable poppet member 44 is biased forwardly, such that it is normally out of engagement with the partition member 32, by a coil spring 58 positioned between the poppet member and the Spauldite washer 48 to normally provide communication between the atmospheric valve chamber 30 and the control valve chamber 28.

Atmospheric pressure is continually supplied to the front power cylinder chamber 60 through air filter 62 and opening 64 in the side walls of the servo-motor; and thence through piston passageway 66 to the atmospheric valve chamber 30. With the poppet member 44 in its normal forward position above described, atmospheric pressure is communicated past the valve seat 54 to the control chamber 28; and thence through piston passageway 68 to the power cylinder chamber 70 on the back side of the power piston. With atmospheric pressure on both sides of the power piston, the normal de-energized condition of the servo-motor is established.

Power actuation of the servo-motor is accomplished by evacuation of the atmosphere from the rear power cylinder chamber 70. Vacuum from the manifold of the vehicle motor is communicated to the vacuum valve chamber 26 through tube 72, flexible hose 74, and the internal opening 76 of a tubular casting 78 positioned forwardly of the main body of the piston. By suitable valve movement hereafter to be described, the vacuum may then be communicated to the valve control chamber 28 and then through piston passageway 68 to the rear power cylinder chamber 70 to actuate the servo-motor.

"Feel" or reaction is provided in the unit shown by means of the hydraulic reaction means G which will not be described since it forms no part of the present invention. For an understanding of its construction and operation, however, reference may be had to Patent 2,685,172 which shows and describes a similar device.

Power actuation of the unit shown in the drawing is brought about by depressing of the foot pedal lever (not shown) of the vehicle, whereupon the push rod F forces the movable poppet member 44 into engagement with the front flange 34 of the valve chamber partition member 32, thereby closing off communication between the atmospheric chamber 30 and the control chamber 28. Continued inward movement of the poppet member 44 lifts the partition member 32 out of engagement with annular valve seat 38 to thereafter communicate the annular vacuum chamber 26 with the control chamber 28. Vacuum is thereupon communicated to the rear power cylinder chamber 70 to provide a differential pressure across the power piston C, thereby causing it to move rearwardly. The power piston C will continue to move rearwardly so long as the operator causes the movable poppet member 44 to be moved rearwardly in the servo-motor. When inward movement of the poppet member is stopped, the power piston C continues to move rearwardly by a small additional amount which permits the annular valve seat 38 carried by the piston to again abut front flange 34 of the valve partition member 32. Further communication between the vacuum valve chamber 26 with the control chamber 28 is thereby prevented and the piston C becomes stationary. In this stationary position assumed by the power piston C, both the atmospheric valve seat 54 and the vacuum valve seat 38 will abut the front flange 34 to provide what is known as a lapped condition of the valve, and in which further communication of both atmospheric pressure and vacuum with the rear power chamber 70 is prevented. With the above described movement of the power piston C, the fluid displacement member D will have caused an application of the vehicle brakes, the intensity of which has a predetermined relationship with the position assumed by the movable poppet member 44. Should the operator desire to intensify the brake application, the push rod F may be moved further inwardly to cause the above described valve movements to be repeated, and a new position of the power piston C assumed.

When it is desired to release the brakes, the operator retracts the vehicle foot pedal lever, whereupon the movable poppet member 44 is caused to move forwardly by the spring 58 and the reaction provided by the hydraulic reaction means G. Forward movement of the poppet member 44 causes the valve seat 54 to move out of engagement with the front flange 34, whereupon atmospheric pressure from the atmospheric valve chamber 30 is communicated with the control valve chamber 28; and thence through piston passageway 68 to the rear power chamber 70. Pressure build up in the power chamber 70 diminishes the differential pressure across the power piston C, whereupon spring 14 in conjunction with the reaction of the fluid displacement member D causes the power piston C to be moved forwardly. When sufficient brake release has been accomplished to suit the operator, further forward movement of the poppet member 44 is stopped, whereupon a slight additional movement of the power piston C carries the front flange 34 into engagement again with the atmospheric valve seat 54. Further change in pressure in the rear power chamber 70 is thereby prevented, and the power piston C becomes stationary. When complete retraction of the brakes is desired, removal of the operator's foot from the foot pedal lever permits the spring 58 and the hydraulic reaction means G to force the valve poppet member 44 forwardly into engagement with the abutment 72—in which position the atmospheric valve seat 54 remains out of engagement with the front flange 34. Continued atmospheric communication with the rear power chamber 70 is thereby assured, and power piston C moves forwardly into its normal brake releasing position shown in the drawing.

Should the vacuum supply fail, manual application of the brakes can be accomplished by depressing the foot pedal lever until the movable poppet member 44 is moved rearwardly into engagement with the abutment 74 on the rear end of the internal piston chamber 24. Thereafter the force applied by the operator causes the power piston C to be moved rearwardly, and the fluid displacement member D to displace fluid from the master cylinder A to apply the brakes of the vehicle. For this to be done in a servo-motor having only the structure so far described, air displacement from the rear power chamber 70 will be caused to flow through piston passageway 68, control chamber 28, vacuum valve chamber 26, flexible hose 74 and tube 72 to the manifold of the vehicle engine. While air flow out of rear piston chamber 70 is taking place, air flow into the front power chamber 60 must also take place since rearward movement of the piston causes the volume of chamber 60 to be enlarged. Air movement into the front power chamber 60 takes place through the air filter 62 and opening 64 in the side walls of the servo-motor.

During manual application of the vehicle brakes, a considerable amount of the manually applied force is used to cause the above described air movement out of power chamber 70 through the control valve of the servo-motor. Manual effort so used, reduces the speed with which the brakes may be applied manually, and dangerously effects the brake response during power failure.

According to the present invention means are provided for preventing the above described dash pot effect experienced during manual application of the vehicle brakes. In the preferred embodiment shown in the drawing, an opening 84 of large capacity is provided through the power piston C for direct communication between the opposed chambers of the servo-motor; and a check valve structure 86 is provided for the opening to prevent air flow from the front power chamber 60 to the rear power chamber 70 when the piston is power actuated.

The check valve structure 86 comprises a rubber coated disk having a stem 90 which projects through the opening 84. An annular valve seat 92 is formed in the rubber coating on the back side of the disk 88 for engagement with the machine surface formed by a slight counterbore 94 on the front face of the piston. The stem 90 of the check valve structure is supported and guided for reciprocatory movement by a disk shaped spacer member 96 fitted into a counterbore 98, and which spacer member is held in place by the rear piston section 22. The annular disk shaped spacer member 96 has a plurality of pie shaped openings 100 therethrough and surrounding the stem 90 to permit air flow thereacross. The disk 88 is biased against its seating surface 94 by a very light conically shaped coil spring 102 positioned between the back side of the front piston section 20 and a C washer 104 deformed into a recess adjacent the rear end of the stem 90.

During manual movement of the piston C air from the rear power cylinder chamber 70 is readily displaced through openings 100 and the piston opening 84 to move the disk 88 out of engagement with the seating surface 94. The conically shaped coil spring 102 helps to support the valve structure 86 and is so proportioned as to offer very slight resistance to the passage of air. Valve structure 86 prevents air flow from the front power cylinder chamber 60 to the rear power cylinder chamber 70 to permit power actuation of the brakes at any time that vacuum is available. Retraction of the power piston C will not usually be a problem, since the force of spring 14 in conjunction with the reaction supplied by the fluid displacement member D is available to move the power piston. During retraction of the piston C air displacement from the front power cylinder chamber 60 flows through the relatively short passageway 66, past valve seat 54 (which will be out of engagement with flange 34) and piston passageway 68 to establish equal pressures on both sides of the piston.

It will be seen that the objects and advantages heretofore enumerated as well as others have been accomplished. While the preferred embodiment of the invention has been described in considerable detail, I do not wish to be limited to the particular construction shown which may be varied within the scope of the invention, and it is the intention to cover hereby all adaptations, modifications and arrangements thereof which come within the practice of those skilled in the art to which the invention relates.

I claim:

In an atmospheric suspended fluid pressure servomotor: a power chamber having a movable wall therein dividing the power chamber into an enclosed forwardly positioned opposing chamber isolated from the atmosphere and a rearwardly positioned opposing chamber continually in communication with the atmosphere, a control valve carried by said movable wall having a flexible vacuum supply line communicating therewith, said flexible supply line communicating an external source of vacuum with said control valve, said valve means having a manually movable control member movable relative to said movable wall from a normal position wherein said valve means communicates atmospheric pressure from said rear chamber to said forward chamber to a position forwardly of said normal valve position wherein it communicates vacuum from said flexible supply line to said forwardly positioned opposing chamber, said movable control member being constructed and arranged to force said movable wall forwardly manually upon further forward relative movement of said control member relative to said movable wall, flow conducting passage means through said movable wall communicating said opposing chambers, said flow conducting passage means having a flow capacity substantially in excess of that of said control valve, and valve closure means for said passage means preventing air flow from said rear opposing chamber to said forward opposing chamber and opening said passage means to its full capacity upon a slight increase in pressure in said forward opposing chamber above that in said rear opposing chamber, whereby substantially atmospheric pressure is maintained in said forward opposing chamber during manual movement of the movable wall.

References Cited in the file of this patent
UNITED STATES PATENTS

| | | |
|---|---|---|
| 1,687,047 | Trail | Oct. 9, 1928 |
| 1,846,089 | Davis | Feb. 23, 1932 |
| 1,879,365 | Lombard | Sept. 27, 1932 |
| 1,879,598 | Bragg et al. | Sept. 27, 1932 |
| 1,927,942 | Lobez et al. | Sept. 26, 1933 |